United States Patent
Drozdenko et al.

(10) Patent No.: US 10,280,771 B2
(45) Date of Patent: May 7, 2019

(54) COMPRESSIBLE FAN BLADE WITH ROOT SPACER

(71) Applicant: UNITED TECHNOLOGIES CORPORATION, Farmington, CT (US)

(72) Inventors: Lee Drozdenko, Bristol, CT (US); William R. Graves, Amston, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 409 days.

(21) Appl. No.: 15/026,377

(22) PCT Filed: Sep. 19, 2014

(86) PCT No.: PCT/US2014/056505
§ 371 (c)(1),
(2) Date: Mar. 31, 2016

(87) PCT Pub. No.: WO2015/053922
PCT Pub. Date: Apr. 16, 2015

(65) Prior Publication Data
US 2016/0237835 A1    Aug. 18, 2016

Related U.S. Application Data

(60) Provisional application No. 61/889,755, filed on Oct. 11, 2013.

(51) Int. Cl.
*F01D 5/32* (2006.01)
*F01D 21/04* (2006.01)
*F01D 5/30* (2006.01)

(52) U.S. Cl.
CPC .......... *F01D 5/323* (2013.01); *F01D 5/3007* (2013.01); *F01D 21/045* (2013.01);
(Continued)

(58) Field of Classification Search
CPC ...... F01D 5/323; F01D 5/3007; F01D 21/045; F01D 5/3092; F05D 2220/36;
(Continued)

(56) References Cited

U.S. PATENT DOCUMENTS 5,033,871 A * 7/1991 Ide ................... B63H 23/326
                                                    384/117
5,160,243 A * 11/1992 Herzner ................ F01D 5/28
                                                    416/220 R
(Continued)

FOREIGN PATENT DOCUMENTS

EP    2014873 A1    1/2009
FR    2841609 A1    1/2004
(Continued)

OTHER PUBLICATIONS

English Translation to Abstract EP2014873.
(Continued)

*Primary Examiner* — David E Sosnowski
*Assistant Examiner* — Eric J Zamora Alvarez
(74) *Attorney, Agent, or Firm* — Cantor Colburn LLP (57) ABSTRACT

A spacer for use in a hub and blade assembly of a gas turbine engine including a first layer of a first material forming the spacer body having an elongate shape. The first material has a first stiffness. A second layer of a second material is mechanically attached to the first layer. The second material has a second stiffness different from the first stiffness.

18 Claims, 7 Drawing Sheets

(52) U.S. Cl.
CPC ...... *F05D 2220/36* (2013.01); *F05D 2230/60* (2013.01); *F05D 2300/506* (2013.01)

(58) Field of Classification Search
CPC ........... F05D 2230/60; F05D 2300/506; F04D 29/322; F04D 29/32234
See application file for complete search history.

(56) References Cited

U.S. PATENT DOCUMENTS

| | | | |
|---|---|---|---|
| 5,240,375 A | 8/1993 | Wayte | |
| 6,132,175 A * | 10/2000 | Cai | F01D 5/284 403/29 |
| 6,447,250 B1 | 9/2002 | Corrigan et al. | |
| 6,513,406 B1 * | 2/2003 | Murray | G05G 1/10 74/473.29 |
| 7,108,484 B2 * | 9/2006 | Thenaisie | F01D 5/323 416/221 |
| 7,938,626 B2 * | 5/2011 | Forgue | F04D 29/322 416/220 R |
| 8,186,961 B2 * | 5/2012 | Stone | F01D 5/3092 416/221 |
| 2005/0254951 A1 | 11/2005 | Thenaisie et al. | |
| 2007/0175451 A1 * | 8/2007 | Beardmore | F02M 61/14 123/470 |
| 2009/0060745 A1 | 3/2009 | Douguet et al. | |
| 2010/0189564 A1 | 7/2010 | Stone | |
| 2012/0107125 A1 | 5/2012 | Reghezza et al. | |
| 2013/0156591 A1 | 6/2013 | Alexander | |
| 2014/0165787 A1 * | 6/2014 | Lombardi | B25G 1/02 81/22 |

FOREIGN PATENT DOCUMENTS

| | | |
|---|---|---|
| WO | 9964726 A2 | 12/1999 |
| WO | 2010125089 A1 | 11/2010 |

OTHER PUBLICATIONS

English Translation to Abstract FR2841609.
European Search Report for Application EP 14 85 3033.
International Search Report for International Application No. PCT/US2014/056505; International Filing Date: Sep. 19, 2014; dated Jan. 8, 2015; 3 Pgs.
Written Opinion for International Application No. PCT/US2014/058505; International Filing Date: Sep. 19, 2014; dated Jan. 8, 2015; 8 Pgs.

* cited by examiner

FIG. 6 ental Patent Application No. 61/889,755 filed Oct. 11, 
COMPRESSIBLE FAN BLADE WITH ROOT SPACER

RELATED APPLICATIONS

This application claims the benefit of and priority to U.S. Provisional Patent Application No. 61/889,755 filed Oct. 11, 2013, the contents of which are incorporated herein by reference in their entirety

BACKGROUND OF THE INVENTION

1. Field of the Invention

The subject matter of the present disclosure generally relates to gas turbine engines and more particularly to spacers used in turbine fan blades.

2. Description of Related Art

Gas turbine engines use a series of blades to compress input gases or to extract energy from exhaust gases. The front-most or leading edge blades are often subjected to unwanted contact, particularly collision with birds. In most cases bird strikes cause little or no damage, but may result in a dented or bent blade. However, bird strikes are also known to have caused significant damage, perhaps the most famous of which is the US Airways Flight 1549 that made a water landing on the Hudson River when bird strikes caused shut down of both of the plane's two engines.

Designing fan blades for bird strike scenarios is challenging for at least two reasons. First, the fan blade must perform in a desired manner during the actual bird strike at the impact site. Second, the fan blade is subject to high bending and twisting loads near the fan blade attachment location in response to the impact. The attachment locations are typically provided by hub slots that receive a root at a base of each fan blade. The root loads are especially damaging if the fan blade is rigidly constrained.

Spacers may be used between the fan blades at the hub to act as a fulcrum against which the fan blades can bend and/or twist under loads. These spacers are rigid to provide support to the blade after assembly.

Such conventional methods and systems have generally been considered satisfactory for their intended purpose. However, there is still a need in the art for spacers with improved impact robustness. There also remains a need in the art for such systems and methods that are easy to make and use. The present disclosure provides a solution for these problems.

SUMMARY OF THE DISCLOSURE

A spacer for use in a hub and blade assembly of a gas turbine engine includes a first layer of a first material. The spacer body has an elongate shape and a first material having a first stiffness. The spacer also includes a second layer of a second material mechanically attached to the first layer. The second material has a second stiffness different from the first stiffness.

The second layer can be over-molded the first layer. The second layer can be in contact with a hub of the hub and blade assembly. The second layer can also be in contact with a root of a blade of the hub and blade assembly.

In certain embodiments, the second layer is disposed between the first layer of the first material and a third layer of the first material. In certain embodiments, the first layer is disposed between the second layer of the second material and a third layer of a second material.

The first material can have a durometer value in a range of 78-82 on a D scale. The second material can have a durometer value in a range of 60-70 on an A scale.

In certain embodiments, the first layer can be bonded to the second layer using a thermal compression process. In certain embodiments, the first layer can be bonded to the second layer using an adhesive.

A fan assembly for a gas turbine engine includes a plurality of fan blades such that each fan blade has a blade root. A hub having grooves formed radially around a circumference of the hub such that each groove is configured to capture one blade root of each of the plurality of fan blades. A spacer, as disclosed above, is configured for use between the blade root and the groove in the hub.

A method of constructing a gas turbine engine fan blade assembly includes providing a hub, providing a fan blade mechanically coupled to the hub at a root of the fan blade and providing a spacer with a first layer of a material having a first compressibility and a second layer of a material having a second compressibility. The method may include inserting the spacer between a root of the fan blade and the hub.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Reference will now be made to the drawings wherein like reference numerals identify similar structural features or aspects of the subject disclosure. For purposes of explanation and illustration, and not limitation, a partial view of an exemplary embodiment of the compressible spacer in accordance with the disclosure is shown in FIG. 2 and is designated generally by reference character 44. Other embodiments of the compressible spacer in accordance with the disclosure, or aspects thereof, are provided in FIGS. 1 and 3-4, as will be described.

Figure 1:
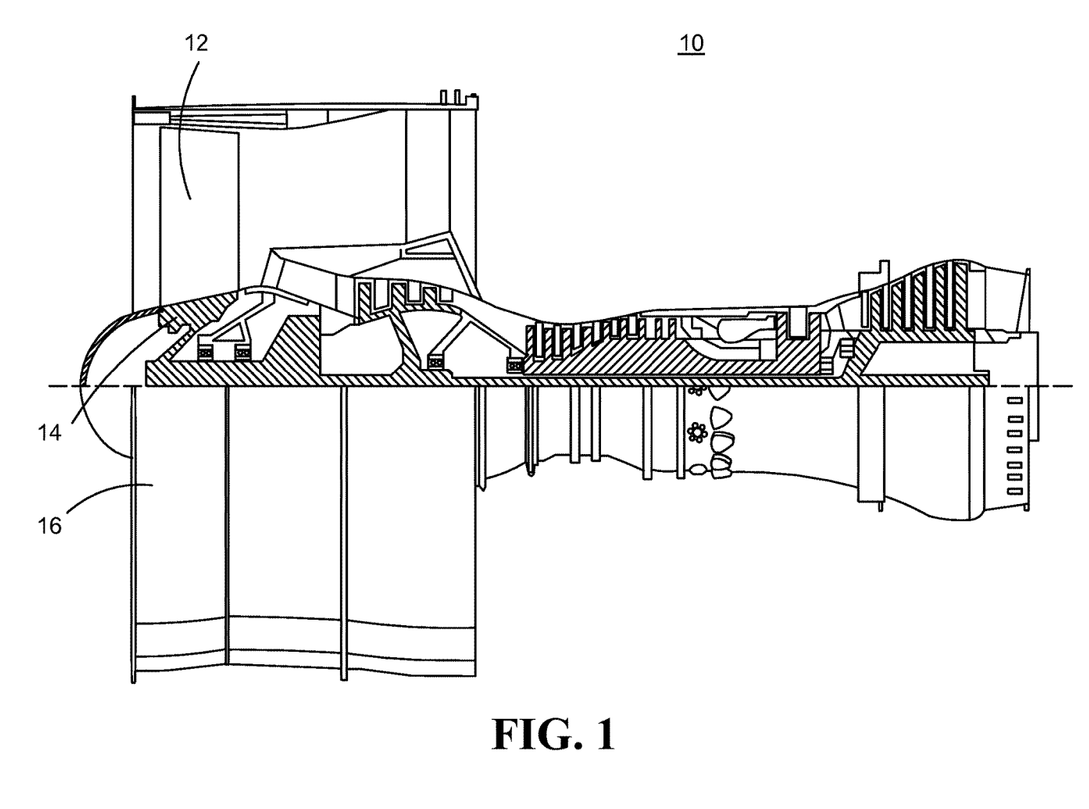
FIG. 1 illustrates a gas turbine engine.
Figure 2:
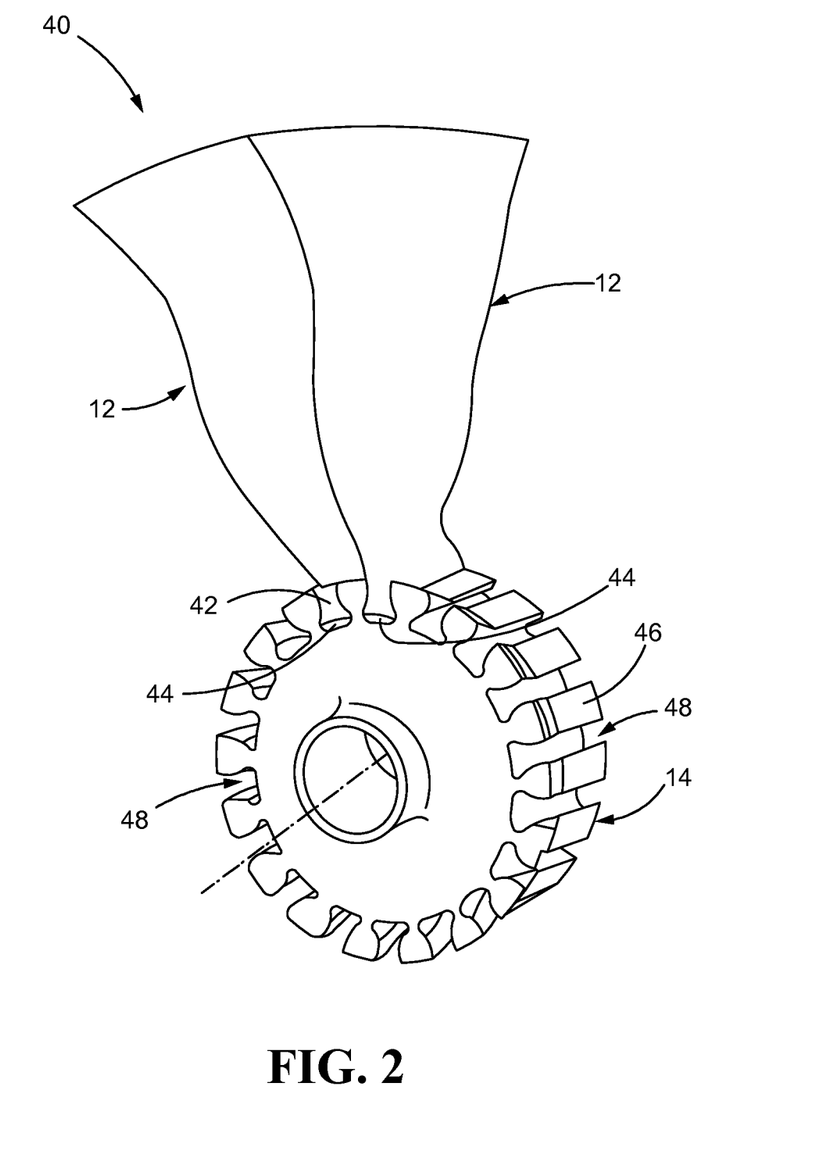
FIG. 2 is a perspective view of a hub with exemplary fan blades.

FIG. 1 illustrates a gas turbine engine 10. Of interest in this exemplary illustration is a fan blade 12 that is one of many fan blades, a hub 14 that supports the fan blade 12 as the hub and fan blades rotate, and a cowling 16 that surrounds the fan blades. Other elements of the gas turbine engine 10, such as compressors, a combustion chamber, and one or more output turbines are known and not discussed here.

The fan blade 12 and the associated arc it describes when spinning presents a significant forward facing, exposed area of the gas turbine engine 10. Therefore, it is the most likely spot on the engine 10 to encounter an object such as a bird during flight. Bird strikes are generally considered unavoidable and are therefore an event that must be designed for. When a bird makes contact with one or more fan blades, a certain amount of energy must be absorbed by the fan blade to prevent damage and in severe cases engine failure. The larger the bird and the higher the speed of impact, the more energy must be absorbed.

For each level of damage that can occur, some critical level of energy must be exceeded. For example, to dent a blade typically requires a certain level of energy transfer, while bending a blade typically requires a higher level of energy transfer. If some amount of energy can be dissipated away from the point of impact, the blade's ability to withstand damage can be improved by raising the effective energy level required for a particular level of damage.

FIG. 2 illustrates a hub assembly 40 with multiple blades 12 and hub 14. Each blade 12 includes a blade root 42. The hub 14 has a number of grooves 48 forming teeth 46 in the hub 14. A compressible spacer 44 is inserted at the root 42 of the blade 12, between the bottom of the blade 12 and the bottom of the groove 48 as shown in more detail in FIG. 3.

Figure 3:
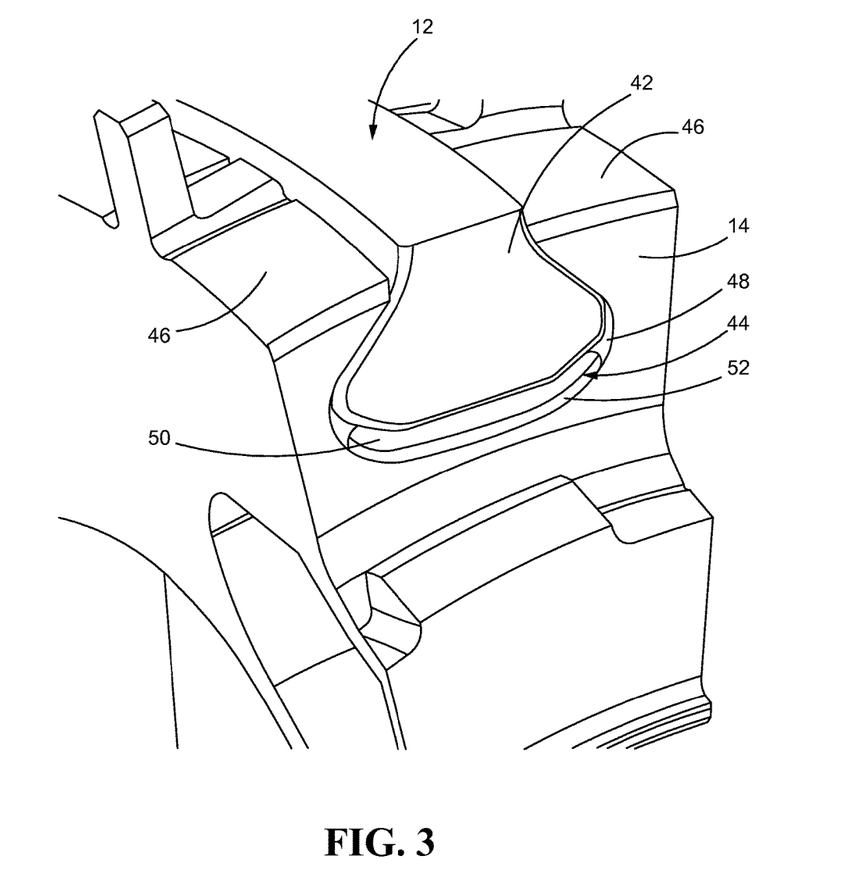
FIG. 3 is an expanded perspective view of the hub and a fan blade with a compressible spacer.

FIG. 3 is an expanded view of the hub 14 and fan blade 12 showing the blade 12 with root 42 inserted in groove 48 of the hub 14. A compressible spacer 44 is shown constructed of a first material 50 and a second material 52.

Figure 4:
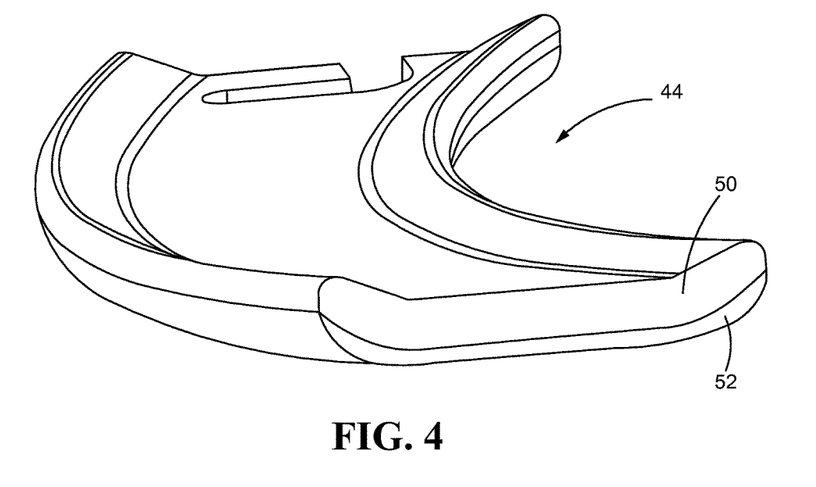
FIG. 4 is a perspective view of exemplary embodiment of a compressible spacer.

FIG. 4 shows an exemplary embodiment of a compressible spacer 44. The spacer 44 includes a first layer of a first material 50 and a second layer of a second material 52. In an exemplary embodiment, the first material 50 is an injection molded polyimide resin. For example, the first material 50 can have a density of about 0.045 lb/in$^3$-0.051 lb/in$^3$ with a durometer value in a range of about 78-82 on a D scale.

The second material 52 is a compressible rubber-type material, for example, with a durometer value in a range of 60-70 on an A scale. The second material 52 can have a density in a range of 0.060-0.070 lb/in$^3$. For example, the second material may be a fluoroelastomer with a vinylidene fluoride monomer, such as Viton®, a product of DuPont Performance Elastomers of Wilmington, Del. The first material 50 may be injection molded and the second material 52 may be over molded onto the first layer to form the second layer. Other materials with different density and durometer characteristics may also be used and the above exemplary embodiments are not meant to limit the range of materials that may be suitable for use in a spacer assembled from more than one material.

The compressible spacer 44 provides the support to the blade root in a conventional manner, similar to that of a spacer made of a single material, such as a polyimide resin. However, the additional layer or layers of the second material having a compressible composition allows the blade root 42 to resiliently deflect during a bird strike or unexpected impact by temporarily deforming the compressible spacer 44. The energy used to deform the compressible spacer 44 effectively transfers energy away from the blade 12, thereby reducing the impact and preventing damage to the engine and aircraft.

In additional embodiments, the second material 52 may be molded separately and coupled to the first layer using a thermal compression process, an adhesive, or another known technique.

Figure 5:
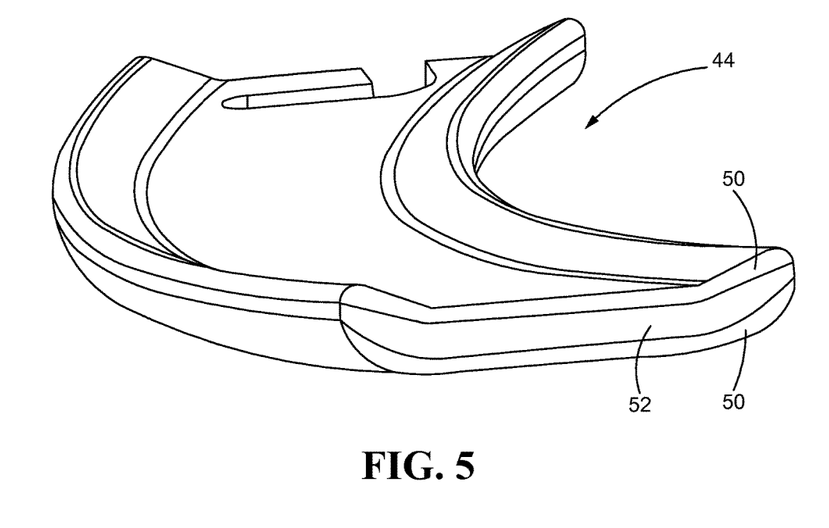
FIG. 5 is a perspective view of an exemplary embodiment of a compressible spacer showing a flexible layer between two rigid layers and FIG. 5A is a perspective view of an exemplary embodiment of a compressible spacer showing a rigid layer between two flexible layers.
Figure 5A:
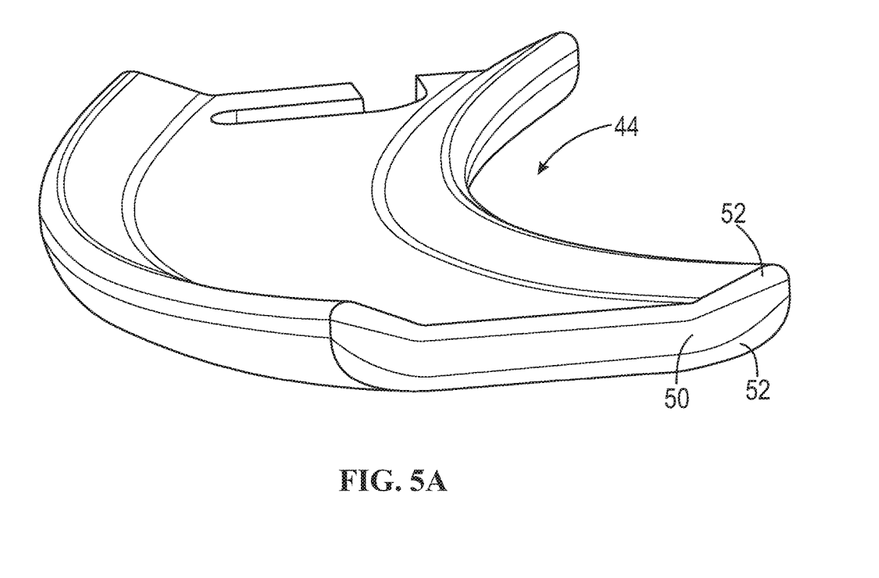

FIG. 5 illustrates another embodiment of a compressible spacer 44. In this embodiment, the second material 52 is surrounded above and below by the first material 50. In additional embodiments, the first and second layers may be reversed as shown in FIG. 5A, or additional layers beyond the three layers of FIG. 5 may be added to improve strength and/or flexibility.

Figure 6:
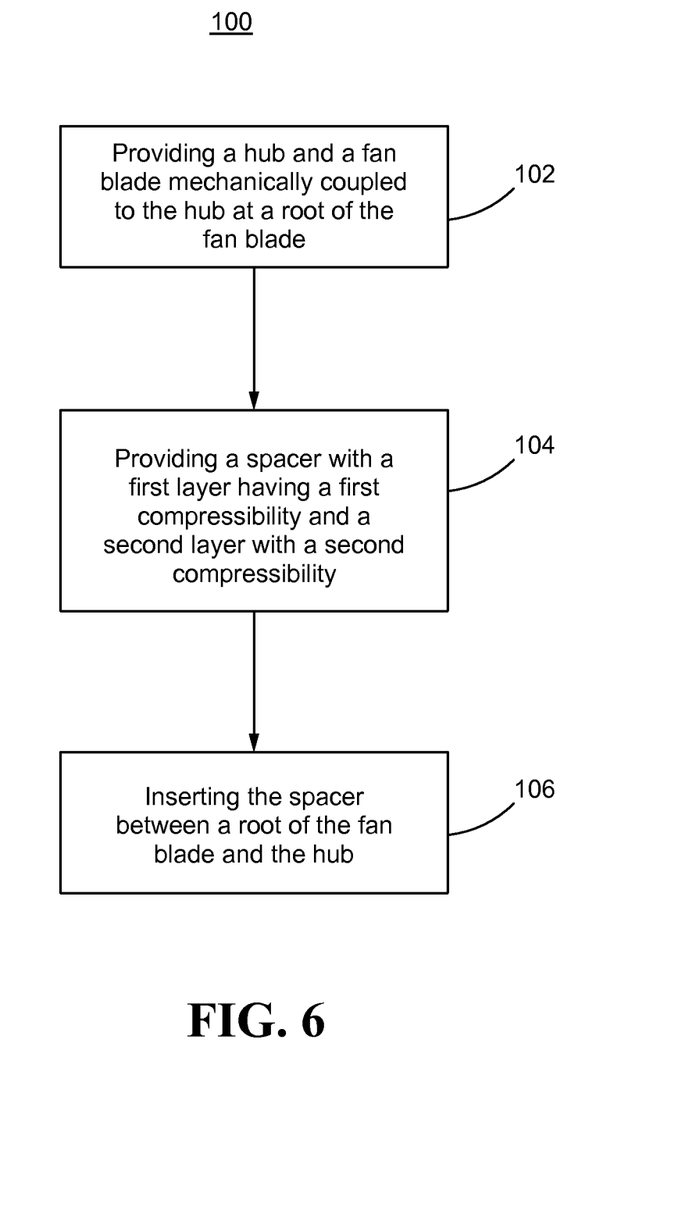
FIG. 6 is a flowchart of an exemplary embodiment of a method using a compressible spacer.

FIG. 6 is a flowchart of a method 100 of constructing a gas turbine engine leading edge fan blade assembly with the compressible spacer 44. At block 102, a hub 14 and a fan blade 12 are provided. The fan blade 12 may be mechanically coupled to the hub 14 at a root 42 of the fan blade.

At block 104 a compressible spacer 44 is provided. The compressible spacer 44 may have a first layer of a material 50 with a first compressibility and a second layer of a material 52 with a second compressibility. The spacer may have the second layer of the material 52 disposed between the first layer and a third layer of the first material 50.

At block 106, the spacer 44 is inserted between a root 42 of the fan blade 12 and the hub 14. The spacer 44 is inserted with the first layer of material 50 in contact with the root 42 of the fan blade 12 and the second layer of the material 52 in contact with the hub 14.

The methods and systems of the present disclosure, as described above and shown in the drawings, provide for a compressible spacer with superior properties including robustness during impact. While the apparatus and method of the subject disclosure have been shown and described with reference to preferred embodiments, those skilled in the art will readily appreciate that changes and/or modifications may be made thereto without departing from the spirit and scope of the subject disclosure.

What is claimed is:

1. A spacer for use in a hub and blade assembly of a gas turbine engine, the spacer comprising:
   a first layer of a first material forming a spacer body having an elongate shape, the first material having a first stiffness; and
   a second layer of a second material mechanically attached to the first layer, the second material having a second stiffness different from the first stiffness, wherein the first material has a durometer value in a range of 78-82 on a D scale and the second material has durometer value in a range of 60-70 on an A scale, and further wherein the second layer is in contact with a hub of the hub and blade assembly, the root of a blade of the hub and blade assembly, or both.

2. The spacer as recited in claim 1, wherein the second layer is over-molded on the first layer.

3. The spacer as recited in claim 2, wherein the second layer is in contact with a hub of the hub and blade assembly.

4. The spacer as recited in claim 2, wherein the second layer is in contact with a root of a blade of the hub and blade assembly.

5. The spacer as recited in claim 1, wherein the second layer is disposed between the first layer of the first material and a third layer of the first material.

6. The spacer as recited in claim 1, wherein the first layer is disposed between the second layer of the second material and a third layer of the second material.

7. The spacer as recited in claim 1, wherein the first layer is bonded to the second layer using a thermal compression process.

8. The spacer as recited in claim 1, wherein the first layer is bonded to the second layer using an adhesive.

9. A fan assembly for a gas turbine engine, comprising:
a plurality of fan blades, each fan blade having a blade root;
a hub having grooves formed radially around a circumference of the hub, each groove configured to capture one blade root of each of the plurality fan blades; and
a spacer, configured for use between the blade root and the groove in the hub, wherein the spacer comprises a first layer of a first material forming a spacer body having an elongate shape, the first material having a first stiffness; and a second layer of a second material mechanically attached to the first layer, the second material having a second stiffness different from the first stiffness, wherein the first material has a durometer value in a range of 78-82 on a D scale and the second material has durometer value in a range of 60-70 on an A scale.

10. The fan assembly as recited in claim 9, wherein the first material forms a first layer and the second material forms a second layer, the second layer of the spacer being over-molded on the first layer of the spacer.

11. The fan assembly as recited in claim 9, wherein the first material forms a first layer and the second material forms a second layer, the first layer of the spacer being bonded to the second layer of the spacer using a thermal compression process.

12. The fan assembly as recited in claim 9, wherein the first material forms a first layer and the second material forms a second layer, the first layer being bonded to the second layer using an adhesive.

13. The fan assembly as recited in claim 9, wherein the first material forms a first layer and the second material forms a second layer, the second layer of the spacer being in contact with a hub of the hub and blade assembly.

14. The fan assembly as recited in claim 9, wherein the first material forms a first layer and the second material forms a second layer, the second layer of the spacer being in contact with the root of the one fan blade of the hub and blade assembly.

15. The fan assembly as recited in claim 9, wherein the first material forms a first layer and a third layer and the second material forms a second layer, the spacer comprising the second layer of the spacer enclosed between the first layer of the first material and the third layer of the first material.

16. A method of constructing a gas turbine engine fan blade assembly, the method comprising:
mechanically coupling at least one root of a fan blade to a hub; and
inserting a spacer with a first layer of a first material having a first compressibility and a second layer of a second material having a second compressibility between the at least one root of the fan blade and the hub, wherein the first material has a durometer value in a range of 78-82 on a D scale and the second material has durometer value in a range of 60-70 on an A scale.

17. The method as recited in claim 16, wherein inserting the spacer between the at least one root of the fan blade and the hub comprises inserting the spacer with the first layer in contact with the root of the fan blade and the second layer in contact with the hub.

18. The method as recited in claim 16, wherein the spacer includes the second layer being disposed between the first layer and a third layer, the third layer having the first compressibility.

* * * * *